(12) United States Patent
Rostampour et al.

(10) Patent No.: US 7,558,724 B2
(45) Date of Patent: Jul. 7, 2009

(54) OPERATION REGION DESCRIBING A VIRTUAL DEVICE

(75) Inventors: Arad Rostampour, Fort Collins, CO (US); Timothy J. Evans, Fort Collins, CO (US); Wendy C. Hamilton, Fort Collins, CO (US); Gregory W. Thelen, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 864 days.

(21) Appl. No.: 11/109,172

(22) Filed: Apr. 19, 2005

(65) Prior Publication Data

US 2006/0248282 A1 Nov. 2, 2006

(51) Int. Cl.
*G06F 9/445* (2006.01)
*G06F 13/00* (2006.01)

(52) U.S. Cl. .................... 703/27; 703/26; 711/100; 719/324

(58) Field of Classification Search .................. 703/2, 703/26, 23, 27; 711/100; 719/324
See application file for complete search history.

(56) References Cited

U.S. PATENT DOCUMENTS

| 6,832,278 | B2 | 12/2004 | Oshins et al. |
| 6,854,121 | B2 | 2/2005 | Barnard et al. |
| 6,865,596 | B1 | 3/2005 | Barber et al. |
| 7,392,172 | B2 * | 6/2008 | Rostampour ............... 703/26 |
| 2003/0130833 | A1 * | 7/2003 | Brownell et al. ............ 703/23 |
| 2005/0044301 | A1 * | 2/2005 | Vasilevsky et al. ........... 711/1 |
| 2006/0129743 | A1 * | 6/2006 | Herrell et al. ............. 711/100 |

\* cited by examiner

*Primary Examiner*—Thai Phan

(57) ABSTRACT

Systems, methods, and devices are provided for embodiments of the present invention to describe a technique that provides an operation region and associated operation region handler to define a virtual device for extending the functionality of an existing operating system.

20 Claims, 4 Drawing Sheets

| OPREGION OFFSET | USAGE | DESCRIPTION |
|---|---|---|
| 402 ~ 0x00 | ADDRESS LOW | LOW 32 BITS OF ADDRESS TO READ OR WRITE FROM |
| 404 ~ 0x04 | ADDRESS HIGH | HIGH 32 BITS OF ADDRESS TO READ OR WRITE FROM |
| 406 ~ 0x08 | DATA LOW | LOW 32 BITS OF DATA WRITTEN OR READ |
| 408 ~ 0x0C | DATA HIGH | HIGH 32 BITS OF DATA WRITTEN OR READ |
| 410 ~ 0x10 | TRIGGER | DETAILS TYPE OF OPREGION TRANSACTION |

*Fig. 4*

OPERATION REGION DESCRIBING A VIRTUAL DEVICE

BACKGROUND

Before a computing device may accomplish a desired task, it must receive an appropriate set of instructions. Executed by a device's processor(s), these instructions direct the operation of the device. These instructions can be stored in a memory of the computer. Instructions can invoke other instructions.

A computing device, such as a server, router, desktop computer, laptop, etc., and other devices having processor logic and memory, includes an operating system layer and an application layer to enable the device to perform various functions or roles. The operating system layer includes a "kernel" (i.e., master control program) that runs the computing device. The kernel provides task management, device management, and data management, among others. The kernel sets the standards for application programs that run on the computing device and controls resources used by application programs. The application layer includes programs, i.e., executable instructions, which are located above the operating system layer and accessible by a user. As used herein, "user space", "user-mode", or "application space" implies a layer of code which is less privileged and more directly accessible by users than the layer of code which is in the operating system layer or "kernel" space. The operating system layer has software programs that include a set of Application Program Interfaces (APIs). The language and/or message format of the APIs allow an operating system to interpret executable instructions received from program applications (e.g., service applications) in the application layer and return results to the program application.

When the execution of the program instructions call for data or other program instructions, the program will want to know where in memory the data or instructions are stored. In effect, the program will use a means for referencing or indexing where in memory the data or instructions are held. The kernel is responsible for virtual memory management. With virtual memory, a process is assigned its own virtual address space, which may not be available to other processes. In virtual memory a process has a logical view of memory that does not correspond to the actual layout of physical memory. When a process uses a virtual memory address the virtual memory system translates it into a physical address using a virtual to physical address mapping contained in some type of look up structure and address mapping database. Addresses exist for both software components and hardware. Physical addresses are partitioned into input/output (I/O) space and memory space. The I/O space is associated with peripheral hardware devices.

More and more operating systems (OSs) are interfacing with advanced configuration and power interface (ACPI) systems. ACPI provides power management, configuration, and other extended capabilities. ACPI is an open industry interface specification that provides a way of communicating system information from firmware to the OS and a means of providing runtime firmware control methods, as well as a set of fixed hardware for the OS to access. Operating systems include interpreters for handling instructions that are not fully compiled into machine code. Interpreters, such as may be used with ACPI, translate programs into machine language at runtime. Operating systems and the address space and interpreters they support may not be written to accommodate later developed system functionality. Likewise, an operating system may support a certain extended functionality only according to a specification version that was available when the operating system was released and not fully support later specification versions. One current area of system functionality expansion relates to "hotplug". "Hotplug" is the ability to add and remove devices to a system without the need to shutdown or reset the system down. Another area of system functionality expansion relates to the ability to process 64 verses 32 bits of data.

BRIEF DESCRIPTION OF THE DRAWINGS

FIG. 4 illustrates a table describing an embodiment of an operation region associated with a virtual device.

DETAILED DESCRIPTION

A new firmware defined operation region for a virtual device and an operation region handler/driver for a virtual device are described to extend system functionality. One embodiment includes a method for virtualizing a device to extend a functionality of an operating system (OS) to perform hardware and/or firmware actions that would not otherwise be supported by the OS. The method includes creating an operation region describing a virtual device. The virtual device forms an API to talk to any hardware and/or firmware. As such, a firmware defined interface is used to control the virtual device from interpreted machine language instructions. The firmware defined operation region handler satisfies the interpreted machine language instruction requests and performs actions directly to other firmware and/or hardware as a result.

One example implementation relates to enabling hotplug of I/O devices using a peripheral component interface (or derivations) card, i.e., PCI-X card. Using the embodiments described herein, the I/O card power control registers of an application specific integrated circuit (ASIC) interface in memory mapped I/O (MMIO) space, that are located in a memory system range above 4 gigabytes (4 GB), can be accessed using ACPI even if a given operating system does not support a 64 bit access mechanism, e.g., uses a 32 bit access mechanism. As the reader will appreciate an access mechanism will have to be 64 bit capable to write and read from registers located in MMIO space above 4 GB. In this example, these registers located above the 4 GB MMIO address are accessed via the API provided by the virtual device, distinctly separate from physical hardware PCI-X devices.

While embodiments of the present invention are described in reference to an ACPI configuration management system, the embodiments are not limited to use with ACPI. Embodiments are intended to operate with and provide benefits with various operating systems, architectures, and/or configuration management systems.

Exemplary Computing System

Figure 1:
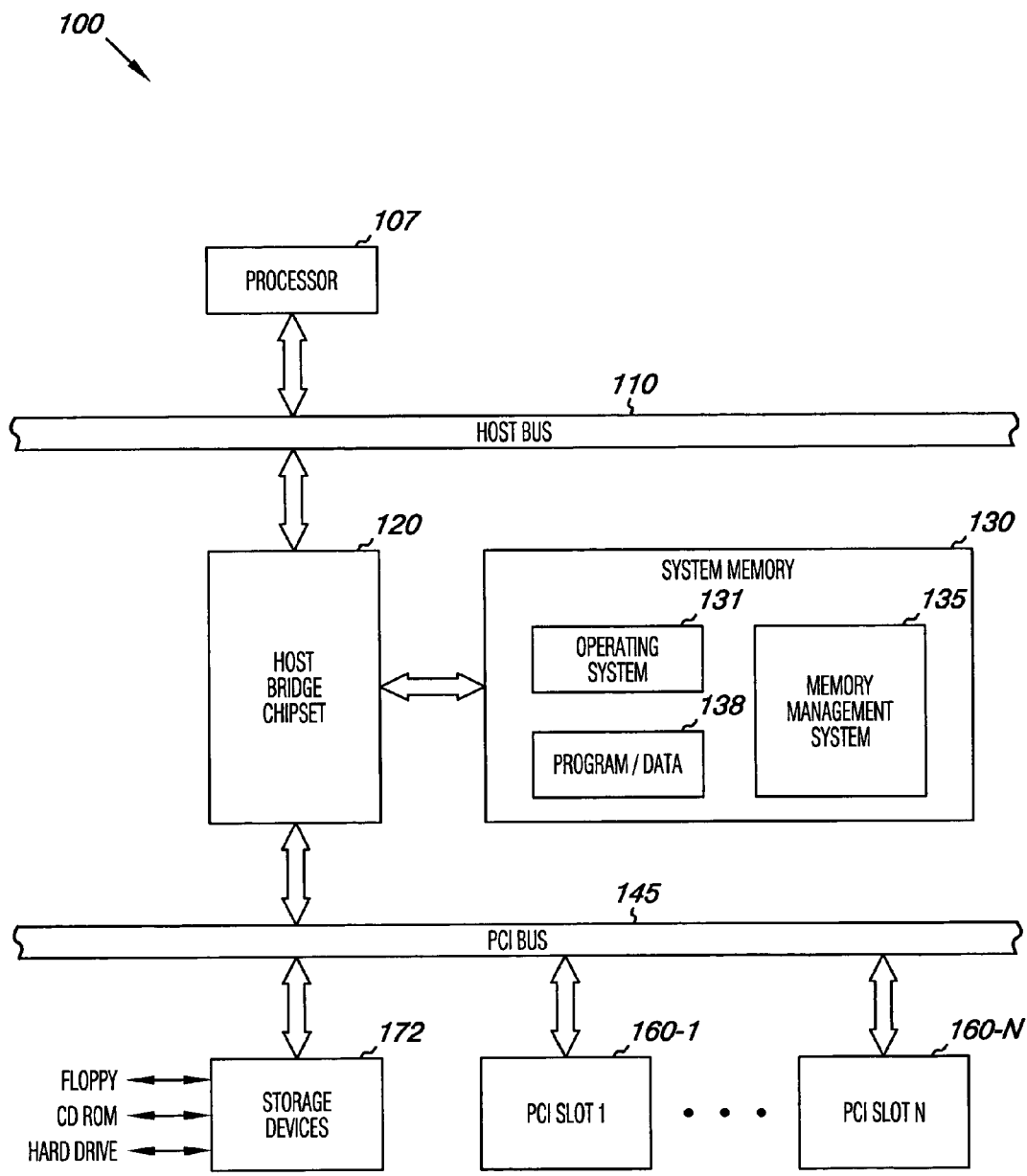
FIG. 1 is a diagram illustrating an example computing system in which embodiments of the invention can be practiced.

FIG. 1 is a diagram illustrating a system or computing device 100 in which embodiments of the invention can be practiced. The system or computing device 100 shown illustrates a processor 107, a host bus 110, a host bridge chipset 120, a system memory 130, a peripheral component interconnect (PCI) bus 145, "N" (representing a scalable number) PCI slots 160-1 to 160-N (e.g., slots for I/O circuit cards, controller cards, and other removable devices), and one or more storage devices (e.g., disks, CDs, hard drives, removable memory, etc.), shown generally as 172.

The processor 107 represents a processing unit of various architectures. Embodiments of the invention can be implemented in a multi-processor or single processor system or computing device. Embodiments described herein can similarly be implemented in a distributed computing network environment, as the same are known and understood by one of ordinary skill in the art. The embodiments are not limited to the examples given herein.

The host bridge chipset 120 includes a number of interface circuits to allow the host processor 107 to access the system memory 130 and the PCI bus 145. The system memory 130 represents one or more mechanisms for storing information. For example, the system memory 130 may include non-volatile and/or volatile memories. Examples of these memories include flash memory, read only memory (ROM), random access memory (RAM), etc. The system memory 130 may be loaded with an operating system (OS) 131, e.g., in ROM. A basic input/output system (BIOS) is stored in ROM in the system memory 130. According to various embodiments, an ACPI BIOS is also stored in ROM and may be stored as a portion of the BIOS. Examples of operating systems include, but are not limited to, Windows, Mac, Unix, Linux, etc. The system memory 130 further includes a memory management system 135, e.g., in RAM, and other programs and data 138. The system memory 130 may also contain additional software as the same will be known and understood by one of ordinary skill in the art. The memory management system 135 includes elements such as virtual memory data structures associated with various processes to support the management of memory in connection with program applications being executed by the processor 107. That is, as one of ordinary skill in the art will appreciate, the memory management system includes programs, code, data, look-up tables, etc.

The PCI slots 160-1 to 160-N provide interfaces to PCI devices. Examples of PCI devices can include printers, removable disk storage and databases, facsimiles, scanners, network interface devices, media interface devices, etc. An example embodiment of the present invention is directed to devices which can be mapped to memory and thus can include circuitry cards to controllers which control the operation of the above mentioned PCI devices. A logic circuit, input/output (I/O) card, circuit card, or other controller, can be mapped to memory for an I/O device. The I/O card, logic circuit, circuit card, or other controller, can be mapped to memory as an I/O space. For clarity, reference is made in this application to memory addresses. However, embodiments are also considered to include such memory mapped I/O space.

For example, network interface devices can include an I/O space which connects to communication channels such as the Internet to in turn provide access to on-line service providers, Web browsers, and other network channels. Media interface devices can include an I/O space and provide access to audio and video devices. Storage devices 172 as well may include an I/O space. Storage devices 172 can include CD ROMs, databases, disks, hard drives, etc. Embodiments, however, are not limited to these examples.

When implemented in firmware, the embodiments of the present invention are the code segments to perform particular tasks. The program or code segments can be stored in a computer/processor readable medium or transmitted by a computer data signal embodied in a carrier wave, or a signal modulated by a carrier, over a transmission medium. A computer readable medium may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The system or computing device 100 can operate in a networked environment, e.g., a local area network (LAN), wide area network (WAN), Internet, and/or wireless network, among others, including hardwire links, optical links, satellite or other wireless communications links, wave propagation links, or any other mechanisms for communication of information.

Exemplary Configuration Management System

Figure 2:
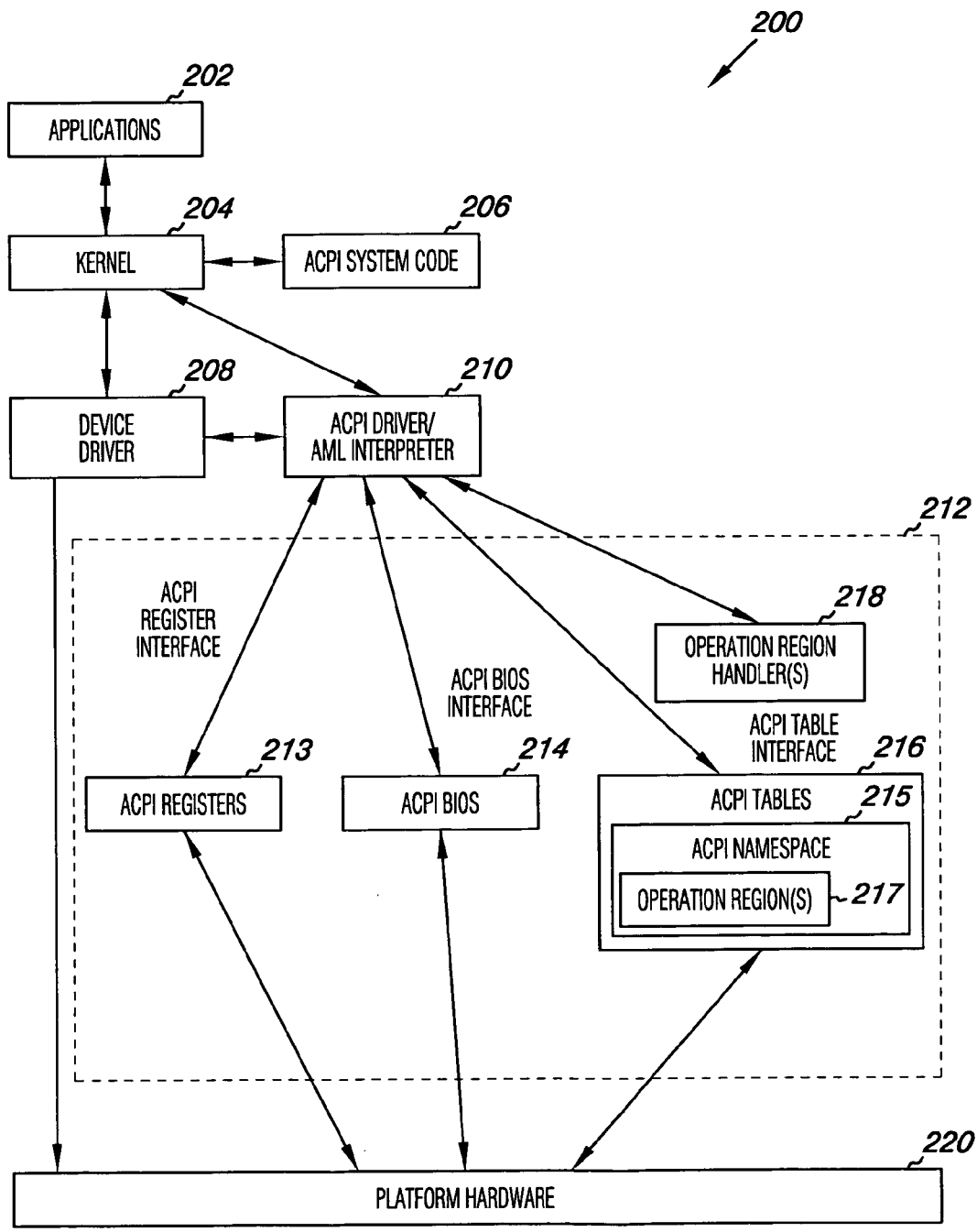
FIG. 2 is a block diagram of an ACPI system which is illustrative of configuration management systems.

FIG. 2 is a block diagram of an ACPI system 200 which is illustrative of configuration management systems. The ACPI system 200 can be implemented on a system or computing device 100 as shown in FIG. 1. As shown in FIG. 2 application programs 202 in user space may interface with a kernel 204 in the operating system. The kernel 204 can be generally considered as one or more software modules that are responsible for performing many operating system functions. One such function is passing information between the application programs 202 and the lower level components of the ACPI system 200, such as various device drivers (e.g., device driver 208), the ACPI driver 210 (described below), and the system hardware 220 (labeled as "platform hardware" in FIG. 2). As shown in FIG. 2, the kernel 204 interfaces with ACPI code 206. The ACPI code 206 includes one or more software modules that may be a part of an operating system 131 in FIG. 1 and that may be used to modify the behavior of certain components of the computer system 100 in FIG. 1. Various device drivers 208 interface with and generally control the system hardware 220, e.g., storage device 172 and other peripheral components connected to PCI slots 160-1, . . . , 160-N, installed on the computer system in FIG. 1.

The ACPI driver 210 is a software module that controls the functioning of much of the ACPI system 200. The ACPI driver 210 may be supplied as part of the operating system 131 in FIG. 1, or as a separate component. The ACPI driver 210 provides an interface 212 between ACPI registers 213, an ACPI BIOS 214, an ACPI namespace 215 (including operation regions 217), operation region handlers 218, and the kernel 204 of the operating system 131 in FIG. 1.

ACPI control methods are written in an interpreted language, i.e., ACPI source language (ASL), which is compiled into ACPI machine language (AML) and stored or loaded into ACPI tables 216. AML is interpreted by an AML interpreter within the ACPI driver 210. The purpose of ACPI control methods is to interact with the system hardware, e.g., host bridge chipset 120 and other peripheral components connected to PCI slots 160-1, . . . , 160-N installed on a computer system, in a manner which hides the hardware specific details from the operating system. An operation region 217 is an ACPI data object where read or write operations to the object are performed in some hardware space. In other words, operation regions represent some memory space that contains hardware registers for exclusive use by ACPI control methods.

An operation region 217 includes established fields that represent registers in the hardware. Once these fields are established, and the operation region 217 is enabled, the fields can be accessed in control methods using the available ASL keywords (like "store"). In the past, there were only five defined operation regions 217 that the ACPI driver 210 set up during boot. These included I/O port, MMIO or system memory, PCI configuration, SMbus, and embedded controller. According to the various embodiments, a new operation region is described to facilitate firmware controlled interaction with particular virtual devices. The same is described in more detail below in connection with FIG. 3.

An operation region has identifying value(s) and a handler that performs accesses to various offsets in that operation region space. The above mentioned operation regions are assigned identifying values by the ACPI specification, e.g., publicly available ACPI specification version 2.0. The ACPI specification also allows vendors to define and handle their own operation regions by using identifying hexadecimal values between 0x80 and 0xff. As the reader will appreciate, programming variables are structures that hold data and are uniquely named by the programmer. Variables are used to hold control and identifying values. A local variable includes values that are referenced only within the subprogram, function or procedure the variable is defined in. A global variable is one that can be used by all modules and functions in the program.

Control methods can determine when an operation region is enabled by use of the _REG control method. When the operating system enables an operation region (by registering its handler), it calls the _REG control method of the current namespace. The _REG method does something like set a namespace global variable to a certain value. Later, before control methods access fields within the operation region, they should first check that namespace global variable to be sure that it contains the value indicating that the operation region has been enabled by the operating system.

Certain operating systems, 131 in FIG. 1, export an interface to the ACPI driver 210 that allows other drivers to do two things: register an operation region handler and call control methods for its namespace. The operation region handler itself performs the accesses to the system memory space. The operation region handler is passed the offset, i.e., distance from the start of a memory address, into the operation region.

Embodiments for Virtualizing a Device

Embodiments of the present invention describe a technique that provides an operation region and associated operation region handler to define a virtual device for extending the functionality of an existing OS in order to perform hardware and/or firmware actions that would not otherwise be supported by the OS.

Figure 3:
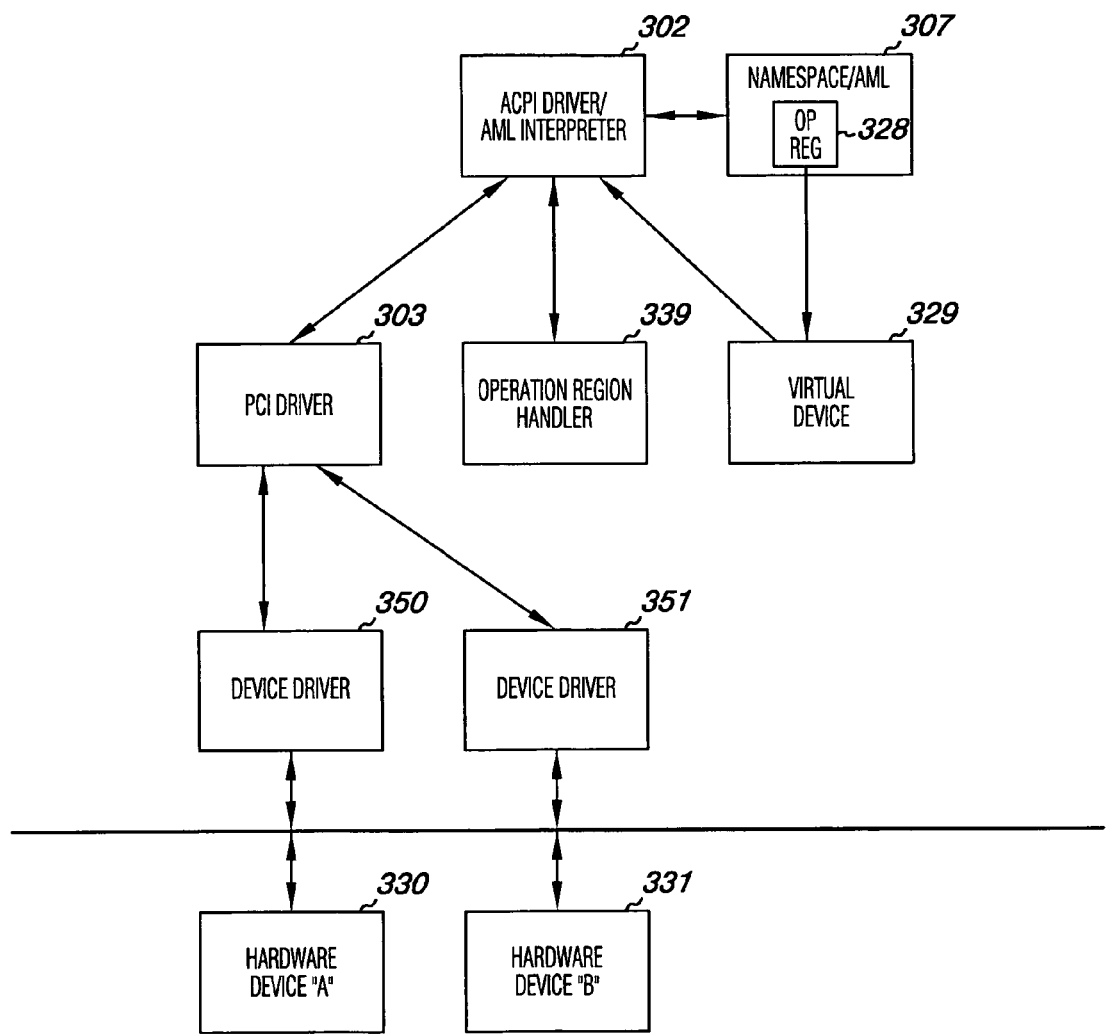
FIG. 3 is a block diagram illustrating an embodiment of an operation region, virtual device, and operation region handler according to various embodiments.

As shown in FIG. 3, an ACPI driver/AML interpreter 302 is responsible for working with PCI drivers 303 to guide the allocation of hardware resources as well as to detect and respond to the arrival and removal of hardware devices. That is, the PCI driver 303 detects bus, e.g., bus 145 in FIG. 1, membership changes (device addition or removal), and accesses bus specific configuration registers.

FIG. 3 further illustrates an operation region 328, virtual device 329, and operation region handler 339 according to embodiments described herein. Each interacts with the ACPI driver/AML interpreter 302, shown as 210 in FIG. 2. The ACPI driver 302 contains an AML interpreter, which executes firmware control methods described in the ACPI namespace 307. The namespace/methods communicate with the operation region 328 representing the virtual device 329. Communication with an operation region 328 invokes the ACPI driver 302, which then to talks to the operation region handler 339 associated with the operation region 328 to complete the requested access. As noted above, this configuration of the embodiments enables an operation region 328 and associated operation region handler 339 to define a virtual device for extending the functionality of an existing OS to perform hardware and/or firmware actions that would not otherwise be supported by the OS.

To illustrate, the following implementation example is discussed in relation to an operating system which supports an ACPI version having only a 32 bit AML interpreter and an I/O interface ASIC that includes registers which reside above 4 GB (i.e., to accommodate hotplugability) and use atomic accesses. Embodiments, however, are not so limited. In the example implementation, consider that a PCI and/or PCI-X slot, which will enable hotplug capability, is provided to the PCI bus (e.g., as one or more of slots 160-1 through 160-N connected to bus 145 in FIG. 1). Consider further that the ASIC (e.g., chipset 120) with which this PCI slot interacts is an I/O interface which includes registers above 4 GB memory space, i.e., will use a 64 bit access mechanism, but that the AML supported by the operating system is only 32 bit capable.

According to various embodiments, an operation region 328 is defined which represents the address space and offsets of a virtual device 329 and when the address space and offsets of the virtual device 329 are accessed they provide an interface, i.e., API, to invoke the operation region handler 339 through the ACPI driver 302 in order to perform real hardware and/or firmware access. The virtual device 329 is not in MMIO or I/O port space, but rather is in its own defined space. And, as described, the virtual device 329 uses an API to accomplish work on the virtual device's 329 behalf, including possible accesses to MMIO and I/O port space. In this example embodiment, chipsets implement power control (for enabling hotplug) as registers that are mapped to MMIO above 4 GB and need to be accessed atomically. Thus, in this example, these chipset registers are indirectly accessed through the virtual device 329 and the AML does not have to talk to the chipset directly, which would involve a 64 bit access mechanism.

Instead, to achieve the 64 bit access, the virtual device 329 and associated operation region 328 are defined by firmware with the ACPI namespace, e.g., 215 in FIG. 2. Accesses are made to the virtual device's 329 defined address space in 32-bit chunks, since the ACPI driver/AML interpreter is only 32 bit capable. The operation region handler 339 acts on behalf of virtual device access requests to translate to and satisfy those requests for direct hardware and/or firmware accesses.

There will be one virtual device 329 per partition and one operation region 328 per virtual device 329. In effect, there will be no problem of one access to a virtual device corrupting another access if control methods are executed atomically, e.g., the AML interpreter is single threaded or is protected by locking mechanisms. Atomic changes are handled completely or not at all. That is, the acceptable outcomes are that all of the operations complete, or none of them do; partial completion is unacceptable. Such a set of operations is usually called a "transaction", and the completion of them in the above described fashion is said to be "atomic" or "transactional".

According to various embodiments, the operation region handler 339 being accessed will enable writes and reads above 4 GB in atomic fashion from ACPI control methods within the ACPI namespace. In the example given herein there are two notions of atomic. The first involves writing a 64-bit quantity as one chunk atomically as designed by a particular chipset. The second involves accessing the virtual device as a sequence. These accesses are done with lock protection so they look atomic and multiple readers/writers will not corrupt data.

In this manner, a virtual device 329 and the corresponding operation region handler 339 is written in such a way to enable reads or writes anywhere in memory or I/O space. The virtual device 329 will enable firmware control methods to write to any device that resides above 4 GB by allowing access to its control methods for writing the operation region. The operation region handler 339 will handle read and write requests to the operation region (described more in connection with FIG. 4). The virtual device 329 will have a hardware device id (_HID). The operation region handler 339 will use a globally unique identifier (GUID) as well as an operation region identifier from the hardware vendor range (i.e., hexadecimal address offsets 0x80 to 0xff). FIG. 4 below, illustrates in more detail the manner in which the virtual device's 329 hexadecimal address offsets in the operation region 328 define an API configuration which AML can use to extend the ACPI functionality that an operating system implements in its ACPI driver/AML interpreter 302.

Exemplary Table Embodiment Describing an Operation Region Associated with a Virtual Device In this example embodiment, the operation region handler (339 in FIG. 3) will register for a specific operation region (328 in FIG. 3) representing the virtual device (329 in FIG. 3). The operation region handler, through the ACPI driver (302 in FIG. 3), provides access to the device's operation region. In this example, and according to the embodiments, the device is a virtual device defined, as well as the associated operation region, by firmware in the ACPI namespace. The operation region handler will read or write to memory or an I/O space, addressed by two 32 bit registers forming a 64 bit address. In the example embodiment implementation described above, the operation region handler is being written in order to enable reads and writes to memory or an I/O space above the 4 GB range from the ACPI control methods within the namespace. These reads and writes will be initiated by ACPI control methods and completed by the operation region handler which is invoked from the ACPI driver/AML interpreter (302 in FIG. 3). In the above example, the need for the use of the new operation region handler is the result of an earlier ACPI version AML interpreter being a 32 bit interpreter and not 64 bit capable. Hence, in this example, the embodiments provide a way to access memory above 4 GB and read and write 64 bit data atomically as desired. Embodiments, however, are not limited to this example.

As represented in the Table embodiment of FIG. 4, an operation region (328 in FIG. 3) will have fields that will represent 64 bits as two 32 bit values for address and data, plus a trigger register. The operation region handler will convert the two 32 bit values back into 64 bit values to complete the access. As the reader will appreciate, a 32 bit AML interpreter will not support ACPI control method access to addresses above 4 GB and 64 bit data, and instead is limited to addresses below 4 GB and 32 bit data. Thus, the embodiment of FIG. 4 illustrates a 64 bit address broken down into one 32 bit component as an address high and another 32 bit address as an address low. Similarly, 64 bit data is illustrated broken down into a 32 bit component represented as data high and another 32 bit component represented as data low. That is, as shown, the operation region handler will store the address and data internally, representing the virtual device (e.g., register) state, each in two 32 bit components used for future reads and writes. According to an embodiment, a 32 bit trigger will be sent to the operation region handler, by an ACPI control method, to initiate a read or write. The triggered event will use the stored address and data values to complete the event.

As described above, the operation region handler (shown as 339 in FIG. 3) will indirectly handle read and write requests to the operation region (328 in FIG. 3). As shown in this example embodiment, the operation handler will maintain five (5) 32 bit registers to implement the read and write requests. Four of these registers are maintained as 32 bit pairs, e.g., 32 bit address high, 32 bit address low, 32 bit data high, 32 bit data low. Thus, the two 32 bit register pairs will contain 64 bits address and 64 bits data information. As noted, the address and data registers are broken into high and low components, 32 bits each. The fifth, e.g., last, 32 bit register will be the trigger register. These five (5) registers correspond to the operation region (328 in FIG. 3). The table of FIG. 4 describes each register and the corresponding offset in the operation region according to this embodiment.

Since the AML interpreter in this example has an upper limitation of 32 bits, a 64 bit address or 64 bit data value will be broken into two 32 bit quantities. For addresses, there will be an address high and address low, and for data, data high and data low. The operation region handler can accept 32 bit quantities. The ACPI namespace will break the operation region address into address low and address high. For data writes, the ACPI namespace will break the data into data high and data low. For data reads, the operation handler will break the data into data high and data low before passing back the data to the ACPI namespace. The address and data registers can be written in any order. The values will be stored in the appropriate register for later use.

In this example, the operation region handler maintains five (5) 32 bit registers. These registers correspond to the fields of the new operation region described herein, e.g., 328 in FIG. 3. In this example embodiment, in order to initiate data access of the memory space, a trigger field 410 will be written to. In the example embodiment shown, a low 32 bits of address to read or write from are maintained at the hexadecimal address offset 0x00 (402) and a high 32 bits of address to read or write from are maintained at the hexadecimal address offset 0x04 (404). The low 32 bits of data written or read are maintained at the hexadecimal address offset 0x08 (406) and the high 32 bits of data written or read are maintained at 0x0C (408). The trigger is maintained at the hexadecimal address offset 0x10 (410). The values previously written to the address and data fields, e.g., 402, 404, 406, and 408, respectively, will be used, as desired, upon a write to the trigger field 410. This implies that the address and data fields, e.g., 402, 404, 406, and 408, can be written to in any order and as many times as desired before a trigger occurs. In this example, accesses to the operation region, e.g. 328 in FIG. 3, fields, e.g., 402-410, are full 32 bit accesses.

Thus, an operation region handler (339 in FIG. 3), through an ACPI driver (302 in FIG. 3), has been described which provides access to a virtual device's (329 in FIG. 3) operation region (328 in FIG. 3). This means that, according to the embodiments, the operation handler can perform read and write requests to the operation region. In the example embodiment given above, the operation region will read or write to memory dependent on two 32 bit registers. These registers hold a 64 bit address broken into address high and low registers. If the address registers change, the location in memory changes. Accordingly, the operation region can be moved anywhere in memory.

In the above example embodiment, the virtual device's offsets, e.g., 402, 404, 406, and 408, in the operation region 400 define an API for which AML can use such a configuration to extend the ACPI functionality an operating system implements in its ACPI interpreter. In this example embodiment, the API will be a 20-byte operation region (e.g., 8 bytes address (32 bits low and 32 bits high) 8 bytes data value (32 bits low and 32 bits high), and 4-5 bytes command) that gets registered when the operation region handler, is loaded.

The operation region handler will not have to be included with the operating system as it may be implemented as an add-on driver. The operating system may not involve the operation region handler for boot on a particular vendor hardware. However, in the example embodiment described above, including an I/O ASIC that provides and interface to a hotplug PCI slot, it will be provided on particular vendor hardware.

In the example described above, a method of virtualizing a device to extend a functionality of an operating system (OS) to perform hardware actions that would not otherwise be supported by the OS has been detailed. Embodiments, however, are not limited to the example given above. That is, from this example, the reader will appreciate the manner in which this technique can be used to extend a functionality of an OS to perform firmware actions that would not otherwise be supported by the OS.

In the above example, two eight (8) byte (e.g., 32 bits each) address and data pairs are accessible as DWORDS (double words, a word being two bytes). In this example, each has been broken into fields for a new operation region of four (4) bytes (e.g., 32 bits). These have been exemplified as address high, address low, data high, and data low. Additionally, a DWORD trigger register specifies attributes such as size, cacheability, and command. Upon access to this trigger register, the corresponding request is performed to the specified address. A write command will use the data high and data low values to perform a 64 bit write to the address specified in the two 32 bit address registers. A read command will fill the two data high and data low values by performing a 64 bit read from the address specified in the two 32 bit address registers. Therefore, the trigger command field, in this example, is the last write done to perform the operation.

Control methods in the ACPI namespace drive read and write operations by writing or reading to the newly described operation region fields. When a control method reads or writes to these operation region fields an associated operation region handler, as described above, is invoked. The operation region handler maintains register state to the corresponding operation region fields. When the operation region handler is invoked by the ACPI driver, the corresponding register state (being maintained by the operation region handler) will be updated on a write, while a read will return the requested value. If the field written was the trigger field, then the operation region handler will take the appropriate action as described by the trigger command using the values stored in the address high and low registers and the data high and low registers.

When the trigger command is written, the operation region handler will map the address using the address high and low registers. In an embodiment, the number of bytes to map will be determined from bits 3:0 of the trigger register, and the type of mapping, uncacheable or cacheable, is determined from bit 4. Bit 5 of the trigger will determine if memory is written or read. All five of the 32 bit registers maintained by the operation region handler can be written to or read from.

A write to the trigger will initiate a read or write of memory or I/O space. A read of one of the five virtual registers will send data back to the calling ACPI control method within the namespace. A write will update one of the five registers. If the write is done to the trigger register, the relevant virtual registers will be updated. An access type, which is passed into the operation region handler, determines the read or write of the five registers described in the above example embodiment. The operation region handler/driver will do registering and de-registering of the operation region with the ACPI driver.

While the above has been described in connection with respect to an ACPI configuration management system, the embodiments are not limited to use with ACPI. Embodiments are intended to operate with and provide benefits with any operating system, architecture, and/or configuration management system in order to extend operating system functionality to perform hardware and/or firmware actions that would not otherwise be supported by the OS.

Those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for virtualizing a device to extend a functionality of an operating system (OS) in a computing device, comprising:
   creating an operation region describing a virtual device;
   providing a operation region handler instruction set, associated with the operation region, that can execute to implement the virtual device; and
   using the operation region to allow machine language instructions in the computing device with an operating system that has a byte access mechanism with a byte access limitation of four gigabytes to communicate with hardware registers located in a memory mapped input/output address space above four gigabytes in sixty-four bit quantities via the virtual device.

2. The method of claim 1, wherein the method includes using offsets within the operation region to define an application program interface (API) in order to extend the functionality of the OS.

3. The method of claim 2, wherein the method includes defining an API which machine language can use to extend the functionality that the OS implements in an interpreter.

4. The method of claim 1, wherein creating the operation region includes defining an address, data, and command set of registers to implement an API to use functionality of the OS to call into the operation region handler instruction set.

5. The method of claim 1, wherein the method includes using firmware to define registers for the virtual device that map to the operation region handler instruction set.

6. A computer readable medium having executable instructions stored thereon to cause a device to perform a method, comprising:
   enabling an operation region for a virtual device;
   registering an operation region handler associated with the virtual device;
   defining registers associated with the virtual device that map to the operation region handler; and
   using offset values in the operation region to define an interface through which a 32-bit AML interpreter can access hardware registers located in a memory mapped input/output address space above 4 GigaBytes in 64-bit quantities via the virtual device.

7. The medium of claim 6, wherein the method includes enabling a 20-byte operation region for the virtual device that is registered when the operation handler is loaded.

8. The medium of claim 7, wherein enabling the 20-byte operation region includes dividing the operation region into five 32 bit fields that correspond to address, data, and trigger registers.

9. The medium of claim 7, wherein the method includes assigning two 8-byte address/data pairs accessible as smaller than 8-byte fields.

10. The medium of claim 7, wherein the method includes:
    enabling an 8 byte address field in the operation region which is divided into a 4 byte low address field component and a 4 byte high address field component;
    enabling an 8 byte data field in the operation region which is divided into a 4 byte low data field component and a 4 byte high data field component; and
    enabling a 4 byte command field in the operation region.

11. The medium of claim 10, wherein the method includes:
    assigning an identifying hexadecimal address offset of 0x00 to the 4 byte low address field;
    assigning an identifying hexadecimal address offset of 0x04 to the 4 byte high address field;
    assigning an identifying hexadecimal address offset of 0x08 to the 4 byte low data field;
    assigning an identifying hexadecimal address offset of 0x0C to the 4 byte high data field; and
    assigning an identifying hexadecimal address offset of 0x10 to the 4 byte command field.

12. A computing device, comprising:
    an operating system;
    an application specific integrated circuit (ASIC) coupled to the operating system; and
    firmware executable on the computing device to:
       enable an operation region for a virtual device;
       register an operation region handler associated with the virtual device;
       defining registers associated with the virtual device that map to the operation region handler; and
       using offset values in the operation region to define an interface through which a 32-bit AML interpreter can access hardware registers located in a memory mapped input/output address space above 4 GigaBytes in 64-bit quantities via the virtual device.

13. The computing device of claim 12, wherein the firmware is executable to define the operation region and the virtual device in an advanced configuration and power interface namespace.

14. The computing device of claim 12, wherein the firmware is executable to register the operation region handler with a globally unique identifier.

15. The computing device of claim 12, wherein:
    the device includes a hotplug I/O bus card coupled to the ASIC;
    the ASIC includes registers for the I/O bus card in a memory mapped input/output (MMIO) address space located above four GigaBytes (GB);
    the operating system includes a 32-bit AML interpreter; and
    the operation region defines an interface through which the 32-bit AML interpreter can access associated hotplug registers for the I/O bus card in the ASIC registers located in the MMIO address space above 4 GB.

16. The computing device of claim 15, wherein the operation region defines an interface through which the 32-bit AML can access address space located in the operation region defined address space below 4 GB.

17. The computing device of claim 12, wherein the operation region defines an interface through which control methods of an ACPI having a 32-bit AML interpreter can perform 64-bit atomic accesses to the MMIO address space.

18. A computing device, comprising:
    an operating system;
    an application specific integrated circuit (ASIC) connected to the operating system; and
    means for using a virtual device to extend a functionality of the operating system (OS), said means comprising:
       creating an operation region describing a virtual device;
       providing a operation region handler instruction set, associated with the operation region, that can execute to implement the virtual device; and
       using the operation region to allow machine language instructions in the computing device with an operating system that has a byte access mechanism with a byte access limitation of below four gigabytes to communicate with hardware registers located in a memory mapped input/output address space above four gigabytes in sixty-four bit quantities via the virtual device via the virtual device.

19. The computing device of claim 18, wherein the means includes extending a functionality of the operation system (OS) without changing an OS implementation of a configuration management system.

20. The computing device of claim 18, wherein the means includes extending a functionality of an interpreter supported by an operating system without changing an OS implementation of an interface associated with the interpreter.

* * * * *

UNITED STATES PATENT AND TRADEMARK OFFICE
CERTIFICATE OF CORRECTION

PATENT NO. : 7,558,724 B2 Page 1 of 1
APPLICATION NO. : 11/109172
DATED : July 7, 2009
INVENTOR(S) : Arad Rostampour et al.

It is certified that error appears in the above-identified patent and that said Letters Patent is hereby corrected as shown below:

In column 11, line 21, in Claim 9, delete "claim 7" and insert -- claim 6 --, therefor.

In column 11, line 24, in Claim 10, delete "claim 7" and insert -- claim 6 --, therefor.

In column 12, line 47, in Claim 18, after "device" delete "via the virtual device".

Signed and Sealed this

Twelfth Day of January, 2010

David J. Kappos
*Director of the United States Patent and Trademark Office*